Figure 1:
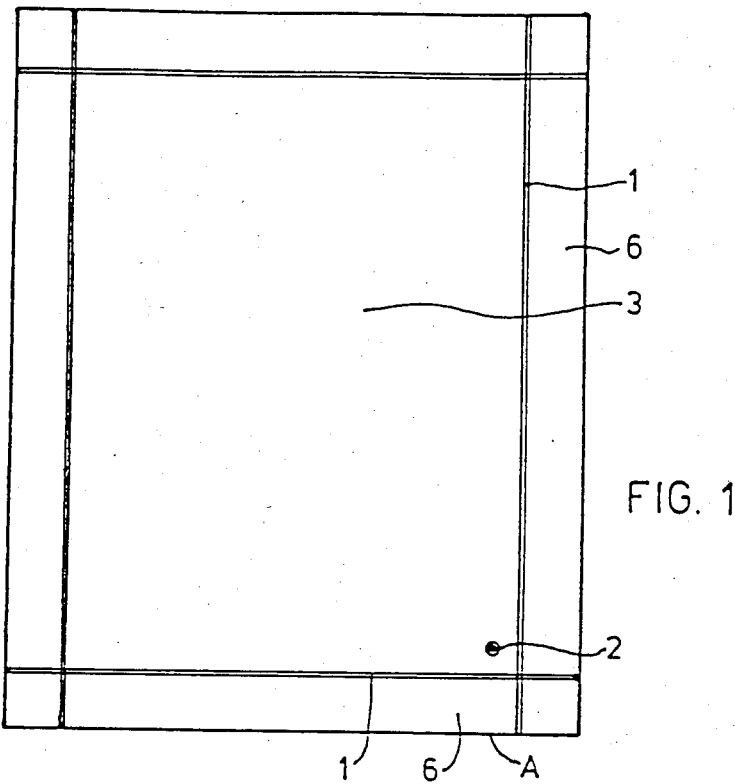

United States Patent [19]

Linde et al.

[11] Patent Number: 4,812,342
[45] Date of Patent: Mar. 14, 1989

[54] PROCESS FOR GASSING SOILS

[75] Inventors: Hartmut Linde, Fallingbostel; Reinhold Mende, Walsrode, both of Fed. Rep. of Germany

[73] Assignee: Wolff Walsrode AG, Walsrode, Fed. Rep. of Germany

[21] Appl. No.: 940,322

[22] Filed: Dec. 11, 1986

[30] Foreign Application Priority Data

Dec. 14, 1985 [DE] Fed. Rep. of Germany ....... 3544308

[51] Int. Cl.$^4$ ..................... B65D 33/16; B65D 33/01
[52] U.S. Cl. ..................................... 428/35.4; 383/66; 383/102; 383/113; 428/346; 428/349; 428/354; 428/507; 428/516; 428/520; 428/522; 47/58
[58] Field of Search ................. 383/102, 103, 113, 66; 428/35, 516, 346, 349, 354, 507, 520, 522; 47/58

[56] References Cited

U.S. PATENT DOCUMENTS

| | | | |
|---|---|---|---|
| 2,419,073 | 4/1947 | Hammer | 47/58 |
| 3,503,497 | 3/1970 | Riely et al. | 383/102 |
| 3,589,861 | 6/1971 | Gunther | 47/58 |
| 4,399,673 | 8/1983 | Alexander | 112/130 |
| 4,608,286 | 8/1986 | Motoishi et al. | 428/516 |
| 4,681,797 | 7/1987 | Van Iseghem | 428/516 |
| 4,683,702 | 8/1987 | Vis | 383/102 |

FOREIGN PATENT DOCUMENTS

| | | |
|---|---|---|
| 1139689 | 7/1961 | Fed. Rep. of Germany . |
| 1924993 | 11/1969 | Fed. Rep. of Germany . |
| 2345923 | 10/1977 | France . |

Primary Examiner—Ellis P. Robinson
Assistant Examiner—James J. Seidleck
Attorney, Agent, or Firm—Sprung Horn Kramer & Woods

[57] ABSTRACT

Process for combating pests and weeds in soil, by covering the soils with films and gassing them with biologically active compounds, especially methyl bromide, wherein the soil covering film, comprises a gas-tight upper film and a gas-permeable lower film joined to the upper film at its edges, which serves at the same time as a gas container from which the gas diffuses through the lower film into the soils to be treated.

10 Claims, 1 Drawing Sheet

U.S. Patent  Mar. 14, 1989  4,812,342

PROCESS FOR GASSING SOILS

The present invention relates to processes for gassing soils with biologically active compounds, especially methyl bromide, which are characterized in that the soil-covering film serves at the same time as a gas reservoir.

It has been known for a long time to employ biologically active compounds, especially methyl bromide for rendering cultivated soils free from microbes by using gas-tight plastic films. Co-extruded and/or laminated composite films based on polyethylene films—with or without a barrier layer—are employed for this purpose. If composites containing a gas barrier layer are used, this layer preferably consists of polyvinylidene chloride, polyester, substantially saponified ethylene/vinyl acetate copolymer or polyamide.

The customery gassing process is carried out essentially by covering the surface of the soil to be treated with the plastic film. In order to reduce the loss of methyl bromide, it is preferable to dig the edges of the film into the soil and then to slide in methyl bromide through perforated PE tubes, laid under the film at an interval of 1–2 meters. This known procedure has the following disadvantages:

Since the methyl bromide is introduced through the perforated PE tubing, the gas concentration is always higher in the immediate vicinity of the tubing and this causes a non-uniform distribution of the remaining bromine ions over the surface of the soil.

The maximum methyl bromide concentration is reached at the end of the introduction of the gas. Thereafter, it falls off exponentially. This concentration pattern is most unfavourable for combating pests, since the duration of action of a high concentration of methyl bromide is relatively short.

Anxiety about failure leads to the methyl bromide dose per square metre of soil frequently being set extremely high when combating pests and weeds. the decisive factor for success is, however, not the dose per square metre of soil, but the methyl bromide concentration in the gas space under the film and the soil. The volume of the gas space can, however, vary in size from case to case. As a result, the same dosage per square metre of soil inevitably leads to varying concentrations in the soil. The known gassing process therefore offers no control at all of the maximum methyl bromide concentration under the film, and therefore lead to the pests becoming resistant as the result of continual overdosing.

The aim of the present invention was, therefore, to provide an improved process for gassing cultivated soils with biological active compounds, especially methyl bromide by controlling the addition of the active compound in such a way that (1) uniform distribution of the active compound under the film is achieved, (2) the active compound concentration in the gas space of the film is regulated to increase gradually up to a maximum value, it being necessary for this value to remain virually constant for a prolonged period of time, and, finally (3) it is possible to provide a controllable maximum active compound concentration under the film in order thereby to avoid the pests and weeds becoming resistant and to cause distinctly less pollution to the environment.

The invention relates, therefore, to a process for combating pests and weeds in soils by covering the soils with film and introducing biologically active compounds, especially methyl bromide gas, characterized in that the soil covering film, comprising, preferably consisting of a gas-tight upper film and a gas-permeable lower film which is joined to the upper film at its edges, serves at the same time as an active compound or active compound/air gas container from which the gas diffuses through the lower film into the soils to be treated.

The invention also relates to soil-covering films such as have been described above for gassing soils with biologically active compounds especially methyl bromide.

All the known thermoplastic, film-forming plastics which themselves afford gas-tight films or can be processed to give composite films having a gas barrier layer can be used for the production of the upper film of the covering film used as the gas container. Examples of thermoplastics which are adequately impermeable to gas are polyvinylidene chloride, polyester, ethylene/vinyl acetate copolymer saponified to the extent of over 90 mol %, polyvinyl alcohol and polyamide. Metal foils can also be employed as the upper film. The upper film preferably consists of a composite film composed of a polyethylene film, a gas barrier layer composed of ethylene/vinyl acetate copolymer saponified to the extent of over 98%, and a sealing layer, preferably composed of low-density polyethylene and customary adhesion-promoting layers. The composite film is preferably prepared by (co)extrusion.

The lower film should be a film having a gas permeability of at least 100 g of methyl bromide/$(m^2 \times d \times bar)$, preferably at least 750 g of methyl bromide/$(m^2 \times d \times bar)$. It is preferable to employ a polyolefin film, such as, for example, a polyethylene film or polypropylene film, a cellophane film or a combination of known films of this type. It is particularly preferable for the lower film to consist of the polyethylene from which the sealing layer of the upper film has also been prepared.

The surface is universally firmly joined to the lower film at the edges, preferably over a width of at least 10 cm or at a distance of at least 10 cm from the edge. This joining seam can be effected in a known manner, preferably by gluing or welding (sealing). The gas container thus formed also has a closable filling aperture in the upper film, preferably a valve, for feeding gas.

The biologically active compounds are especially pest and plant disease controlling agents, e.g. herbicides, arthropodicides and nematodicides.

A preferred compound is methylbromide. Other preferred compounds are methylchloride, ethylene dibromide, $PH_3$, HCN and $CO_2$.

In accordance with the invention, it is preferable to adopt the following procedure or a corresponding procedure using other active compounds:

Before gassing is begun, a furrow 5–10 cm deep corresponding to area to be gassed is dug in the ground. The covering film is then laid smoothly on the soil to be treated with the gas-permeable side of the film (lower film) on the underside, it being necessary that the edges of the film should lie in the prepared furrows. The edges are then covered with soil up to the joining seam. Since in the course of this the gas-tight upper film present at the edge is also dug in, loss of methyl bromide through the film is virtually excluded in the subsequent gassing procedure.

The covering film is charged through the filling aperture, preferably a valve, either with pure methyl bromide or first with air and then with methyl bromide, so that it is possible to adjust the methyl bromide concentration in the container to a specific value.

This methyl bromide concentration of a methyl bromide/air mixture predetermined in this way in the container makes it possible to regulate the diffusion rate of the methyl bromide through the gas-permeable lower film and hence the duration of the gassing process. In addition, it is possible in this way to limit the maximum concentration in the soil area; this concentration will always be less than the initial concentration of the methyl bromide in the container, as a result of which it is possible to avoid overdosing and substantially to prevent development of resistance caused thereby in the pests.

Additionally, a result of the procedure according to the invention is to achieve uniform diffusion of the methyl bromide into the ground over the whole area covered by the film. This diffusion is also independent of the dosage of methyl bromide and is controlled by the diffusion of the gas through the lower film, which proceeds much more slowly than the distribution of the methyl bromide within the film container. The economic efficiency of the gassing is improved markedly by this optimization of the distribution of methyl bromide over the area of soil to be gassed.

This improvement is also achieved because the methyl bromide concentration in the gas space between the ground and the lower film initially increases gradually, as the diffusion of the gas through the lower film proceeds. The maximum methyl bromide concentration in the area of soil is reached either when the concentration values above and below the lower film are the same and/or when the consumption of methyl bromide in the soil is just as great as the rate at which additional gas is supplied by diffusion. As long as additional methyl bromide is supplied from the reservoir, this maximum concentration varies only slightly and does not decrease more rapidly until the supply is exhausted. The final result of this is that adequate destruction of pests and weeds is achieved using a much lower amount of methyl bromide than hitherto.

A plan view of the covering film is illustrated in FIG. 1.

Figure 2:
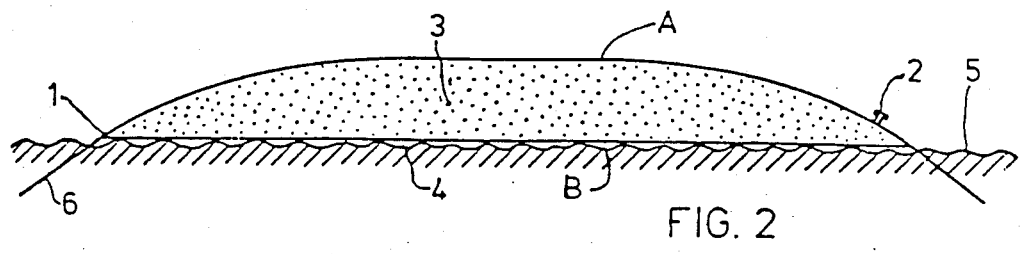

A cross-section through the laid covering film, filled with methyl bromide, is illustrated in FIG. 2.

Figure 3:
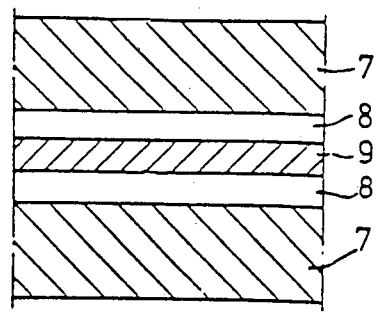

FIG. 3 shows the construction of an upper film.

In detail, the plan view of the covering film in FIG. 1 shows the upper film (A) which is joined to the lower film (B) via the welds (1), the joining seams, thus forming the film edges (6) and the gas container (3). The gas container (3) is filled with methyl bromide or with a gas mixture consisting of methyl bromide and air via the closable filling aperture (2).

FIG. 2 shows the covering film according to the invention in use, the film edges (6) having been dug into the soil (4) up to the welded seam (1). The lower film (B) thus lies as smoothly as possible on the surface of the ground (5) to be treated. The gas mixture diffuses at a controlled rate through the lower film from the gas container (3). The methyl bromide or methyl bromide/air mixture has been introduced through the valve (2) in the gas-tight upper film (A).

FIG. 3 shows the preferred construction of the gas-tight surfaces A, which consists of a gas barrier layer (9), preferably composed of saponified ethylene/vinyl acetate having a thickness of 3 $\mu$m and which carries on each surface a combination of a customary adhesion-promoting layer having a thickness of 2.5 $\mu$m (8) and a sealing layer (7), preferably composed of low-density polyethylene having a thickness of 16 $\mu$m.

EXAMPLE

The gas container was produced by welding a surface A, 40 $\mu$m thick, to a lower film B, 30 $\mu$m thick, in accordance with FIG. 1 and 2.

The surface A has a symmetrical structure corresponding to FIG. 3. A low-density grade of polyethylene was used to make the sealing layer, a polyethylene copolymer was used to make the adhesion-promoting layer and an ethylene/vinyl alcohol copolymer was used to make the barrier layer material. The lower film (B) was made of the same polyethylene as the upper film.

The upper film A is virtually gas-tight and has an extremely low gas permeability of 0.0003 ml/h/m$^2$ (ml/l), corresponding to approximately 0.03 g of MeBr/(M$^2$×d×bar) at 30° C., and the lower film has a gas permeability of 12 ml/h/m$^2$ (ml/l), corresponding to approximately 1200 g of Me Br/(m$^2$×d×bar) at 30° C.

The dimensions of the gas container thus produced were as follows:
length: 50 m
width: 4 m
film edge: 0.2 m.

A closable filling aperture was attached manually to the film in one corner of the upper film by welding using a sealing bit. The welded seams were then produced in a customary manner.

Before gassing, a furrow 10 cm deep—corresponding to the dimensions of the gas container—was dug into the ground. The gas container was then laid smoothly on the cultivated soil to be treated with the gas-permeable side of the film (lower film B) on the underside, in such a way that the edges of the gas container lay in the prepared furrows. The edges were then buried with soil up to the welded seam.

A gas mixture consisting of one part by volume of air and one part by volume of MeBr, altogether 9 kg of MeBr (approximately 2 m$^3$) and 2 m$^3$ or air, was introduced through the filling aperture. This corresponds to 50 g of MeBr/m$^2$).

After a gassing period of 10 days, the gas container was removed, with due regard to the customary safety regulations for methyl bromide.

Soil samples before gassing had shown that 97 nematodes (threadworms) had been counted per 100 g of soil. After gassing, nematodes could no longer be found in the soil samples.

We claim:

1. A container for gassing soils with gaseous biologically active compounds, wherein the container comprising a gas-tight upper film and a gas-permeable lower film joined to the upper film at its edges to form the container and a closable filling aperature disposed in the upper film.

2. A container according to claim 1, in which the upper film comprises a gas barrier layer composed of an ethylene/vinyl acetate copolymer saponified to the extent of over 98%, the gas barrier layer having a top surface and a bottom surface, two adhesion-promoting layers, one of said adhesion-promoting layers disposed on said top surface of the gas barrier layer and the other of said adhesion-promoting layers disposed on said bottom surface of the gas barrier layer and a sealing layer disposed on each adhesion-promoting layer, said sealing layer comprising low-density polyethylene.

3. A container according to claim 1, in which the upper film is prepared by (co)-extrusion.

4. A container according to claim 1, in which the lower film is selected from the group consisting of a polyolefin film, a cellulose film and a combination thereof.

5. A gas container for gassing soils with gaseous biologically active compounds, wherein the container comprises a gas-tight upper film and a gas-permeable lower film joined to the upper film at its edges to form the container, wherein the upper film comprises a gas barrier layer composed of an ethylene/vinyl acetate copolymer saponified to the extent of over 98%, the gas barrier layer having a top surface and a bottom surface, two adhesion-promoting layers, one of said adhesion-promoting layers disposed on said top surface of the gas barrier layer and the other of said adhesionpromoting layers disposed on said bottom surface of the gas barrier layer and a sealing layer disposed on each adhesion-promoting layer, said sealing layer comprising low-density polyethylene.

6. A container according to claim 5, in which the upper film is prepared by (co)-extrusion.

7. A container according to claim 5, in which the lower film is selected from the group consisting of a polyolefin film, a cellulose film and a combination thereof.

8. A container according to claim 5 in which the lower film comprises a polyethylene film from which a sealing layer of the upper film is also prepared.

9. A container according to claim 5, wherein the lower film has a gas permeability of at least 100 g of methyl bromide/$(m^2 \times d \times bar)$.

10. A container according to claim 5, wherein the lower film has a gas permeability of at least 750 g of methyl bromide/$(m^2 \times d \times bar)$.

* * * * *